US010120691B2

(12) United States Patent
Ginzburg et al.

(10) Patent No.: US 10,120,691 B2
(45) Date of Patent: Nov. 6, 2018

(54) CONTEXT SWITCHING MECHANISM FOR A PROCESSOR HAVING A GENERAL PURPOSE CORE AND A TIGHTLY COUPLED ACCELERATOR

(71) Applicant: Intel Corporation, Santa Clara, CA (US)

(72) Inventors: Boris Ginzburg, Haifa (IL); Ronny Ronen, Haifa (IL); Eliezer Weissmann, Haifa (IL); Karthikeyan Vaithianathan, Bangalore (IN); Ehud Cohen, Kiryat Motskin (IL)

(73) Assignee: INTEL CORPORATION, Santa Clara, CA (US)

( * ) Notice: Subject to any disclaimer, the term of this patent is extended or adjusted under 35 U.S.C. 154(b) by 249 days.

(21) Appl. No.: 15/214,270

(22) Filed: Jul. 19, 2016

(65) Prior Publication Data
US 2016/0328234 A1 Nov. 10, 2016

Related U.S. Application Data

(63) Continuation of application No. 13/993,273, filed as application No. PCT/US2012/031681 on Mar. 30, 2012, now Pat. No. 9,396,020.

(51) Int. Cl.
G06F 9/30 (2018.01)
G06F 9/38 (2018.01)
(Continued)

(52) U.S. Cl.
CPC ........ *G06F 9/3016* (2013.01); *G06F 9/30036* (2013.01); *G06F 9/3851* (2013.01);
(Continued)

(58) Field of Classification Search
CPC .. G06F 9/3016; G06F 9/30036; G06F 9/3851; G06F 9/3881; G06F 9/461; G06F 9/485
See application file for complete search history.

(56) References Cited

U.S. PATENT DOCUMENTS 6,412,050 B1 6/2002 Jourdan et al.
6,437,788 B1 8/2002 Milot et al.
(Continued)

FOREIGN PATENT DOCUMENTS

CN 1423196 A 6/2003

OTHER PUBLICATIONS

International Preliminary Report on Patentability for Application No. PCT/US2012/031681, dated Oct. 9, 2014, 6 pages.
(Continued)

Primary Examiner — Emerson C Puente
Assistant Examiner — Jonathan R Labud
(74) Attorney, Agent, or Firm — Nicholson De Vos Webster & Elliott LLP

(57) ABSTRACT

In one embodiment, a processor includes an accelerator, a decoder to decode a first instruction into a decoded first instruction, and a second instruction into a decoded second instruction, and an execution unit to execute the first decoded instruction to, for a thread executing on the accelerator that is to be placed in an inactive state, cause a save of context information for the thread, and a save of a vector identifying the accelerator corresponding to the context information, and execute the second decoded instruction to read the vector to determine the accelerator to restore saved context information into for the thread, read the saved context information, and restore the saved context information into the accelerator.

20 Claims, 8 Drawing Sheets

(51) Int. Cl.
    *G06F 9/46*    (2006.01)
    *G06F 9/48*    (2006.01)
(52) U.S. Cl.
    CPC ............ *G06F 9/3881* (2013.01); *G06F 9/461* (2013.01); *G06F 9/485* (2013.01)

(56) References Cited

U.S. PATENT DOCUMENTS

| | | | |
|---|---|---|---|
| 6,671,795 | B1 | 12/2003 | Marr et al. |
| 6,804,632 | B2 | 10/2004 | Orenstien et al. |
| 6,931,641 | B1 | 8/2005 | Davis et al. |
| 6,948,034 | B2 | 9/2005 | Aoki |
| 7,024,542 | B2 | 4/2006 | Savransky et al. |
| 7,257,679 | B2 | 8/2007 | Clark |
| 7,260,684 | B2 | 8/2007 | Mendelson et al. |
| 7,404,067 | B2 | 7/2008 | Aamodt et al. |
| 7,451,333 | B2 | 11/2008 | Naveh et al. |
| 7,493,621 | B2 | 2/2009 | Bradford et al. |
| 7,617,499 | B2 | 11/2009 | Bradford et al. |
| 7,631,307 | B2 | 12/2009 | Wang et al. |
| 7,849,465 | B2 | 12/2010 | Zou et al. |
| 7,966,511 | B2 | 6/2011 | Naveh et al. |
| 8,451,281 | B2 | 5/2013 | Ginzburg |
| 8,458,498 | B2 | 6/2013 | Rotem et al. |
| 8,627,014 | B2 | 1/2014 | Sheaffer et al. |
| 8,627,017 | B2 | 1/2014 | Sheaffer et al. |
| 8,719,819 | B2 | 5/2014 | Wang et al. |
| 2002/0007387 | A1 | 1/2002 | Ginsberg |
| 2002/0040429 | A1 | 4/2002 | Dowling |
| 2002/0124237 | A1 | 9/2002 | Sprunt et al. |
| 2002/0144083 | A1 | 10/2002 | Wang et al. |
| 2002/0166042 | A1 | 11/2002 | Almog et al. |
| 2003/0023663 | A1 | 1/2003 | Thompson et al. |
| 2003/0028751 | A1 | 2/2003 | McDonald et al. |
| 2003/0033345 | A1 | 2/2003 | Keefer et al. |
| 2003/0105927 | A1 | 6/2003 | Aoki |
| 2003/0126186 | A1 | 7/2003 | Rodgers et al. |
| 2004/0008200 | A1 | 1/2004 | Naegle et al. |
| 2004/0107369 | A1 | 6/2004 | Cooper et al. |
| 2004/0128489 | A1 | 7/2004 | Wang et al. |
| 2004/0148491 | A1 | 7/2004 | Damron |
| 2005/0071438 | A1 | 3/2005 | Liao et al. |
| 2005/0125802 | A1 | 6/2005 | Wang et al. |
| 2005/0172292 | A1 | 8/2005 | Yamada et al. |
| 2006/0271765 | A1 | 11/2006 | Tell et al. |
| 2006/0288192 | A1 | 12/2006 | Abernathy et al. |
| 2007/0006231 | A1 | 1/2007 | Wang et al. |
| 2007/0124736 | A1 | 5/2007 | Gabor et al. |
| 2008/0256330 | A1 | 10/2008 | Wang et al. |
| 2009/0216958 | A1 | 8/2009 | Biles et al. |
| 2012/0066474 | A1 | 3/2012 | Funk |
| 2012/0079304 | A1 | 3/2012 | Weissmann et al. |
| 2012/0131309 | A1 | 5/2012 | Johnson et al. |
| 2012/0185709 | A1 | 7/2012 | Weissmann et al. |
| 2012/0233439 | A1 | 9/2012 | Ginzburg et al. |
| 2013/0027410 | A1 | 1/2013 | Ginzburg et al. |
| 2013/0027416 | A1 | 1/2013 | Vaithianathan et al. |
| 2013/0262816 | A1 | 10/2013 | Ronen et al. |
| 2014/0082630 | A1 | 3/2014 | Ginzburg et al. |

OTHER PUBLICATIONS

Abandonment from U.S. Appl. No. 13/993,273, dated Feb. 18, 2014, 1 page.
Ajanovic J., "PCI Express (PCIe) 3.0 Accelerator Features," Intel Corporation, Aug. 2008, 10 pages.
Boston University, "The Linux Kernel: Process Management," CS591, Spring 2001, 22 pages.
Chappell R.S., et al., "Simultaneous Subordinate Microthreading (SSMT)," in ISCA '99: Proceedings of the 26th annual international symposium on Computer architecture, IEEE Computer Society, 1999, pp. 186-195.
Extended European Search Report from European Patent Application No. 12873375.5, dated Dec. 15, 2015, 9 pages.
First Office Action and Search Report from foreign counterpart Chinese Patent Application No. 201280072154.0 , dated Mar. 27, 2017, 18 pages. (Translation available only for office action).
"Intel 64 and IA-32 Architectures Software Developer's Manual," Combined vols. 1, 2A, 2B, 2C, 3A, 3B and 3C, Dec. 2011, *vol. 2A—pp. 3-197 to 3-235.
"Intel 64 and IA-32 Architectures Software Developer's Manual", Combined vols. 1, 2A, 2B, 2C, 3A, 3B and 3C, Dec. 2011, vol. 2B—pp. 4-685 to 4-695.
"Intel 64 and IA-32 Architectures Software Developer's Manual," Combined vols. 1, 2A, 2B, 2C, 3A, 3B and 3C, Dec. 2011, vol. 3A—pp. 13-9 to 13-15.
Intel, "Intel Advanced Vector Extensions Programming Reference," Document reference No. 319433-011, Jun. 2011, 595 pages.
International Search Report and Written Opinion for Application No. PCT/US2012/031681, dated Nov. 28, 2012, 9 pages.
Ismail A., et al., "FUSE: Front-End User Framework for O/S Abstraction of Hardware Accelerators," Field-Programmable Custom Computing Machines (FCCM), 2011 IEEE 19th Annual International Symposium, IEEE, May 1, 2011, pp. 170-177, XP031869960, DOI 10.1109/FCCM.2011.48, ISBN 978-1-61284-277-6.
Jun N., "Idle Using PN I Monitor/mwait," LWN.net, Eklektix, Inc., Jul. 8, 2003, 3 pages.
Luk C.K., "Tolerating Memory Latency Through Software-Controlled Pre-Execution in Simultaneous Multithreading Processors," ISCA '01: Proceedings of the 28th Annual International Symposium on Computer Architecture, 2001, pp. 40-51.
Mathew B., et al., "A Loop Accelerator for Low Power Embedded VLIW Processors," ACM, Codes+ISSS '04, Sep. 8-10, 2004, pp. 6-11. Retrieved from the Internet : http://www.ann.ece.ufl.edu/courses/eel6935_11fal/papers/Topic9.pdf.
Mehta P., "Tolapai SoC Architecture Overview," Intel Embedded Processor, Intel Developer Forum 2008, 33 pages.
Non-Final Office Action from U.S. Appl. No. 13/993,273, dated Oct. 13, 2015, 20 pages.
Notice of Allowance from U.S. Appl. No. 13/993,273,dated Mar. 15, 2016, 10 pages.
Roth A., et al., "Speculative data-driven multithreading," In HPCA '01: Proceedings of the 7th International Symposium on High-Performance Computer Architecture (HPCA'01), IEEE Computer Society, 2001, pp. 37-48.
Second Office Action from foreign counterpart Chinese Patent Application No. 201280072154.0, dated Dec. 8, 2017, 16 pages.
Steffan J.G., et al., "A Scalable Approach to Thread-Level Speculation," ISCA '00: Proceedings of the 27th Annual International Symposium on Computer Architecture, ACM, 2000, pp. 1-12.
Tuck N., et al., "Multithreaded Value Prediction," HPCA'05: Proceedings of the 11th International Conference on High Performance Computer Architecture, IEEE Computer Society, 2005, pp. 5-15.
Wallace S., et al., "Threaded Multiple Path Execution," OSCA '98:Proceedings of the 25th Annual International Symposium on Computer Architecture, IEEE Computer Society, 1998, pp. 238-249.

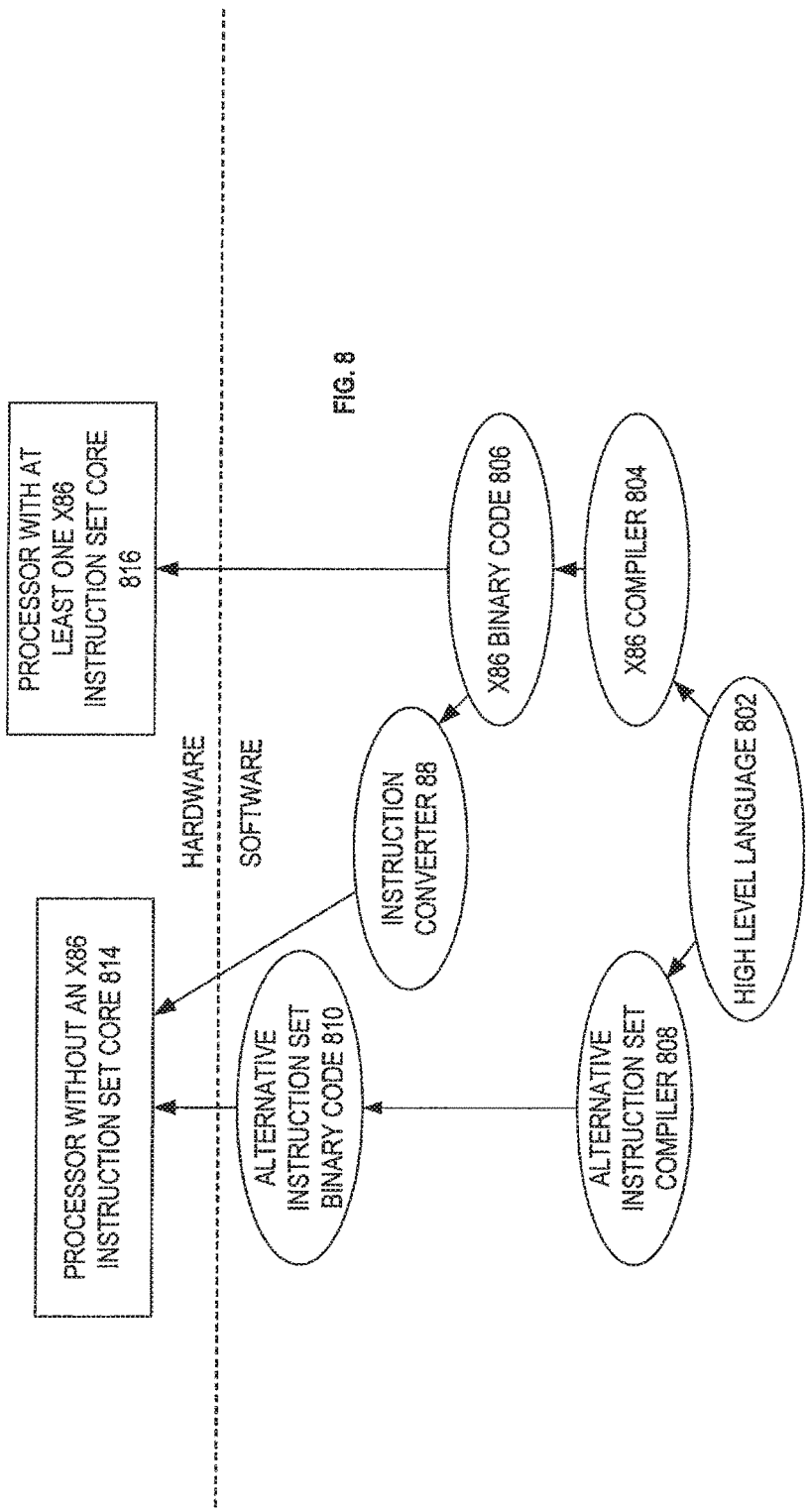

CONTEXT SWITCHING MECHANISM FOR A PROCESSOR HAVING A GENERAL PURPOSE CORE AND A TIGHTLY COUPLED ACCELERATOR

CROSS REFERENCE TO RELATED APPLICATIONS

The present patent application is a continuation application claiming priority from U.S. patent application Ser. No. 13/993,273, whose § 371(c) date is Aug. 6, 2014, and titled: "Context Switching Mechanism for a Processing Core Having a General Purpose CPU Core and a Tightly Coupled Accelerator", which is the U.S. National Phase Application under 35 U.S.C. § 371 of International Application No. PCT/US2012/031681, filed Mar. 30, 2012, and titled: "Context Switching Mechanism for a Processing Core Having a General Purpose CPU Core and a Tightly Coupled Accelerator", both of which are incorporated herein by reference in their entirety.

FIELD OF INVENTION

The field of invention relates generally to the computing system design, and, more specifically, to a context switching mechanism for a processor having a general purpose core and a tightly coupled accelerator

BACKGROUND

Traditional Integration of Co-Processors

As semiconductor manufacturing processes are reaching an era that approaches 1 trillion transistors per die, design engineers are presented with the issue of how to most effectively put to use all the available transistors. One design approach is to implement specific computation intensive functions with dedicated hardware "acceleration" on die along with one or more general purpose CPU cores.

Acceleration is achieved with dedicated logic blocks designed to perform specific computation intensive functions. Migrating intensive computations to such dedicated logic blocks frees the CPU core(s) from executing significant numbers of instructions thereby increasing the effectiveness and efficiency of the CPU core(s).

Although "acceleration" in the form of co-processors (such as graphics co-processors)) are known in the art, such traditional co-processors are viewed by the OS as a separate "device" (within a larger computing system) that is external to the CPU core(s) that the OS runs on. These co-processors are therefore accessed through special device driver software and do not operate out of the same memory space as a CPU core. As such, traditional co-processors do not share or contemplate the virtual addressing-to-physical address translation scheme implemented on a CPU core.

Moreover, large latencies are encountered when a task is offloaded by an OS to a traditional co-processor. Specifically, as a CPU core and a traditional co-processor essentially correspond to separate, isolated sub-systems, significant communication resources are expended when tasks defined in the main OS on a GPP core are passed to the "kernel" software of the co-processor. Such large latencies favor system designs that invoke relatively infrequent tasks on the co-processor from the main OS but with large associated blocks of data per task. In effect, traditional co-processors are primarily utilized in a coarse grain fashion rather than a fine grain fashion.

As current system designers are interested in introducing more acceleration into computing systems with finer grained usages, a new paradigm for integrating acceleration in computing systems is warranted.

CPUID/XSAVE/XRSTORE Instructions and the XCR0 Register

An Instruction Set Architecture (ISA) currently offered by Intel Corporation supports mechanisms for enabling, externally saving and re-storing the state of certain hardware supported "extensions" to the ISA's traditional instruction set. Specifically, according to one implementation, the ISA's floating point instructions (x87), 128 bit vector instructions (SSE) and 256 bit vector instructions with 3 operand instruction format (AVX) are each viewed as separate "extensions" to the ISA's traditional instruction set (x86).

A control register, XCR0, that is internal to the processor can be written to by software to enable any one or more of these extensions. Specifically, the XCR0 register maintains one bit for each the three extensions (i.e., an x87 bit, an SSE bit and an AVX bit). Software (e.g., the operating system (OS)) to permit software to individually set the various bits to individually enable the x87/SSE/AVX extensions according to its own intentions. The XCR0 register is understood to have additional, currently undefined bit positions, so that additional extensions can be added in the future and enabled/disabled accordingly.

A CPUID instruction has been implemented in the ISA that the software can use to determine how much memory space is needed to externally store the state information of the enabled extensions. For example, with various input operand values, the CPUID instruction can be executed by the software to determine: i) the total amount of memory space needed to store all the state information of all the enabled extensions; ii) the total amount of memory space needed to store all the state information of any particular one of the enabled extensions. Thus, for example, if the x87 and SSE extensions are enabled, the CPUID instruction can be used to determine: i) the total amount of memory space needed to store all the state information of the x87 and SSE extensions; ii) the total amount of memory space needed to store all the state information of just the x87 extension; and, iii) the total amount of memory space needed to store all the state information of just the SSE extension.

Here, as the state information for an extension largely corresponds to the information stored in the extension's associated data registers (i.e., the floating point registers for the x87 extension, the 128 bit registers for the SSE extension, the 256 bit registers for the AVX extension), the CPU hardware knows "how large" the register space is for each of its extensions and can readily provide/return such information as a resultant of the CPUID instruction.

As such, in a typical case, software will execute the CPUID instruction to understand how much memory space needs to be allocated for the state information of the various extensions it has enabled, then, proceed to allocate such memory space.

The XSTORE instruction is called by software to externally save the state information of any/all enabled extensions. Here, the memory address where the state information is to be saved is provided as an input value to the instruction and the processor core causes the state information of the extension(s) to be written to system memory at that address. Less than all of the enabled extensions may have their state information saved on any particular execution of the XSTORE instruction. A mask register utilized by an executing XSTORE instruction whose bit positions essentially correspond to those of the XCR0 register is used to selectively specify which enabled extensions are to have their state information stored by the XSTORE instruction. The externally stored information also includes an XSTATE_BV vector field that corresponds to the mask register information. That is, the XSTATE_BV vector field indicates which of the extensions have had their state information externally stored in memory.

The XRSTOR instruction corresponds to the logical opposite of the XSTORE instruction. In the case of the XRSTOR instruction, an input value to the instruction specifies where the state information for the extension(s) are stored in system memory. Execution of the instruction causes the processor core to read the state information from memory at that address and load the state information into the appropriate extension register space. As part of the loading process, the processor first reads the contents of the XSTATE_BV vector field stored in memory to understand which extensions have had their state information stored in memory. The processor then loads into itself from memory the state information of those extensions that have had their state information externally stored in memory as indicated in the XSTATE_BV vector field. Ideally, the XRSTOR instruction is provided a mask vector that matches the contents of the XSTATE_BV vector read from memory and whose set bits correspond to enabled extensions in the XCR0 register.

BRIEF DESCRIPTION OF THE DRAWINGS

The present invention is illustrated by way of example and not limitation in the figures of the accompanying drawings, in which like references indicate similar elements and in which:

FIG. 8 shows a software instruction converter.

DETAILED DESCRIPTION

Figure 1:
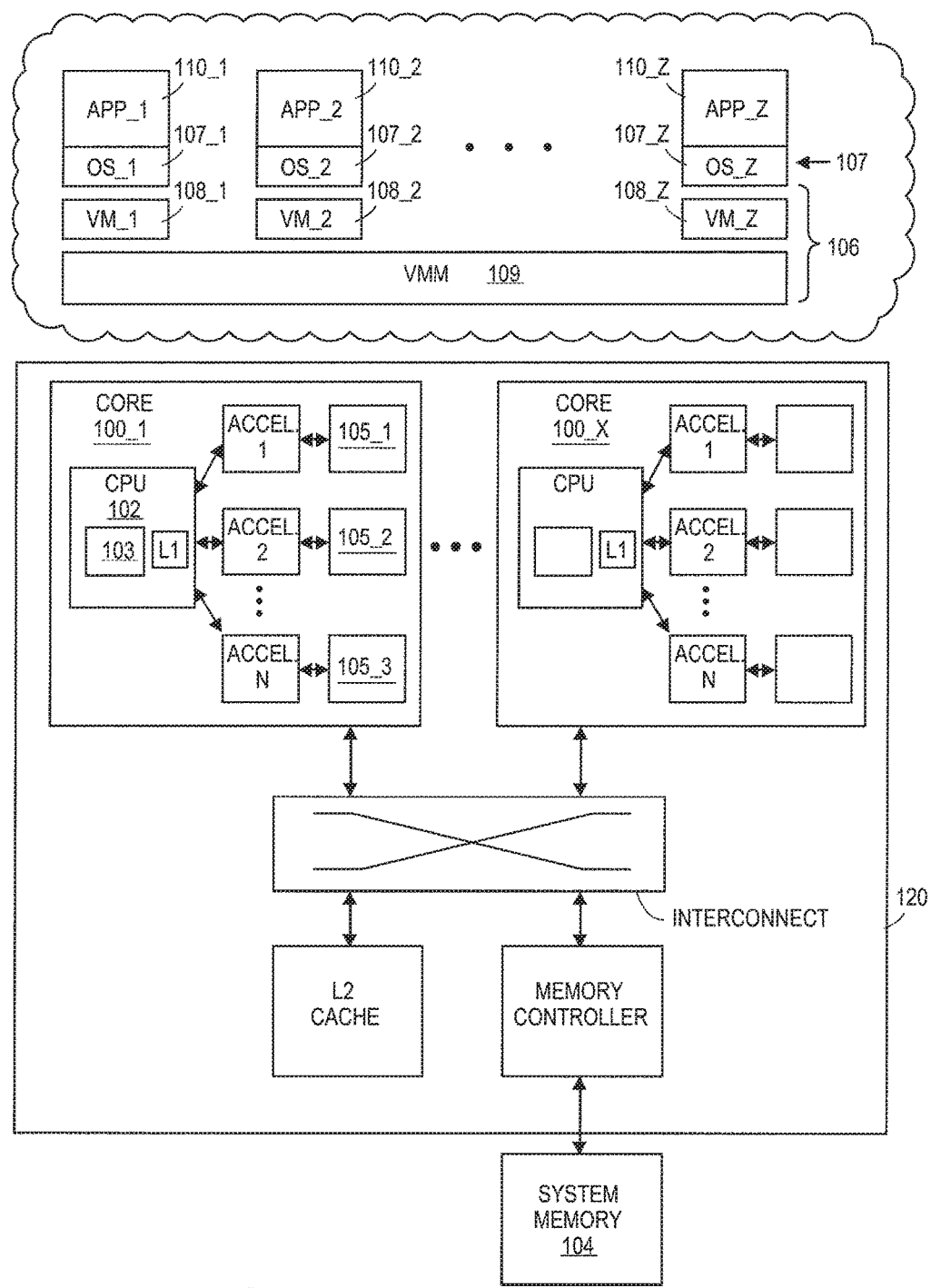
FIG. 1 shows a computing system whose processing cores each include a general purpose processing core and accelerators that are tightly coupled to the general purpose processing core.

FIG. 1 shows new processing core 100_1 architecture in which accelerators 101_1 to 101_N are designed akin to large scale functional units coupled to the core's traditional general purpose CPU 102. Multiple such cores 100_1 to 100_Q may be disposed on a single processor 120 disposed on a semiconductor chip as observed in FIG. 1.

Here, standard instructions are read from memory and executed by the core's traditional functional units in the CPU core 102. Other types of instructions that are received by the processing core 100_1, however, will trigger an accelerator into action. In a particular implementation, the underlying hardware supports the software's ability to call out a specific accelerator in code. That is, a specific command can be embodied into the code by the software programmer (or by a compiler), where, the specific command calls out and defines the input operand(s) for a specific accelerator unit.

The command is ultimately represented in some form of object code. During runtime, the underlying hardware "executes" the object code and, in so-doing, invokes the specific accelerator with the associated input data.

Upon being invoked, the accelerator operates out of the same memory space as the CPU core 102. As such, data operands may be identified to the accelerator with virtual addresses whose corresponding translation into physical address space is the same as those used by the CPU core 102. Moreover, generally, the execution time of an accelerator unit's execution of a command is longer than that of a traditional/standard instruction (owing to the complex nature of the tasks being performed). The input operand(s) and/or resultant may also be larger than the standard register sizes of the instruction execution pipeline(s) within the CPU 102.

An accelerator can therefore be generally viewed as being coarser grained (having larger execution times and/or operating on larger data chunks) than the traditional functional units and instructions of the CPU 102. At the same time, an accelerator can also generally be viewed as being finer grained, or at least more tightly coupled to the CPU core 102 than a traditional co-processor.

Specifically, the avoidance of a time expensive "driver call" in order to invoke the accelerator and/or the sharing of same memory space by the accelerator and general purpose CPU 102 corresponds to tighter coupling to the between the general purpose CPU 102 and accelerator as compared to that of a traditional co-processor. Moreover, the specific individual tasks that the accelerators are called on to perform may also be more fine grained than the larger, wholesale tasks traditionally performed by a co-processor. Specific individual tasks that are suitable for implementation with an accelerator as a single "invokable" operation include texture sampling, motion search or motion compensation, security related computations (e.g., cryptography, encryption, etc.), specific financial computations, and/or specific scientific computations.

The general purpose CPU core 102 may one or more instruction execution pipelines. Modern day CPU cores are typically capable of concurrently executing multiple threads. Concurrent execution of multiple threads with multiple pipelines is a straightforward concept. However, a single pipeline can also be designed to support concurrent execution of multiple threads as well.

Additionally, modern day CPU cores and/or OSs are typically capable of maintaining/comprehending more threads than can be simultaneously active. For example, a CPU core may be able to consider 8 threads as presently active, yet, an additional 8 more threads are permitted to exist (they are just not presently active). As one possibility, over the course of time, the CPU core 102 switches all 16 threads back and forth between active and inactive. As such, the CPU core 102 is theoretically able to devote some resources to all 16 threads over a span of time.

The distinction between an active thread and an inactive thread is that an active thread has its context information stored locally in the registers of the CPU core's 102, while, an inactive thread has its context information stored external to such registers such as in system memory 104. A thread's "context" includes the thread's operative information such as the values of specific variables that the thread's program code is operating upon.

Thus, as part of the activity of switching threads back and forth between active and inactive states, the activities of a general purpose CPU core 102 include: i) externally saving context information from CPU 102 registers 103 to system memory 104 for a thread that is switching from active to inactive; ii) internally loading context information from system memory 104 to CPU 102 registers for a thread that is switching from inactive to active.

Depending on implementation, the determination of which threads are active vs. which threads are inactive, and the control of the associated switching, may be implemented in software (e.g., in the OS), the general purpose CPU core 102 or other associated hardware, or some combination of both. In an embodiment the CPU core's registers 103 hold data operands and/or resultants of one or more of integer instructions, floating point instructions and vector instructions executed by functional units of the pipeline as called out by the thread's program code. The CPU registers may also keep thread specific control information such as location of page tables and directories, etc.

An issue is that, heretofore, accelerator units have not been tightly coupled with a general purpose CPU core generally. As such, in the new approach of FIG. 1, a thread's context information is apt to have not only operand and/or other information of the execution units and pipeline of the CPU core 102 (e.g., context of integer, floating point and vector functional units in registers 103), but also, operand and/or other information of one or more accelerators (e.g., in accelerator registers 105). As such, part of the operation of the new approach of FIG. 1 is to include the switching of accelerator related context information between the processing core 100 and system memory 104 commensurate with the switching of traditional context information between CPU core registers 103 and system memory 104. Said another way, context information within both CPU core and accelerator registers 103, 105 can be switched in/out of system memory 104 to support activation/inactivation of a single thread.

Before continuing, it is worthwhile to mention that many present day computing systems implement "virtualization". In a typical implementation, a layer of software 106 is imposed between the operating system 107 software and the CPU hardware 120. This layer of software 106 typically includes one or more virtual machines (VMs) 108_1-108_Z that "run on top" of a virtual machine monitor (VMM) 109. Although not a strict requirement, FIG. 1 shows a common arrangement where different software application instances 110_1-110_Z are each provided with its own operating system instance 107_1-107_N that runs on top of a corresponding dedicated virtual machine 108_1-108_N.

A VM presents the appearance of a CPU to the software that runs on it. As a consequence, at least as a first approximation, the software running on the virtual machine may "think" that it has the resources of an entire computer system to itself. The VMM 109 is responsible for supporting multiple VMs on an underlying multi-processor CPU 120. As such, the VMM 109 coordinates the concurrent requests/needs of the multiple VMs on the multi-processor CPU 120. This includes correlating allocations of actual resources of the underlying computing system (e.g., CPU threads, system memory space, disk drive storage space, etc.) to the "virtual" computing system resources that the software running on the VMs refer to. Thread activation/inactivation and associated context switching control can at least partially be performed by an OS instance, a VMM or some combination of both. As such, for simplicity, the term "OS" will be used to refer to an operating system instance, a virtualization layer, or some combination of both.

Figure 2:
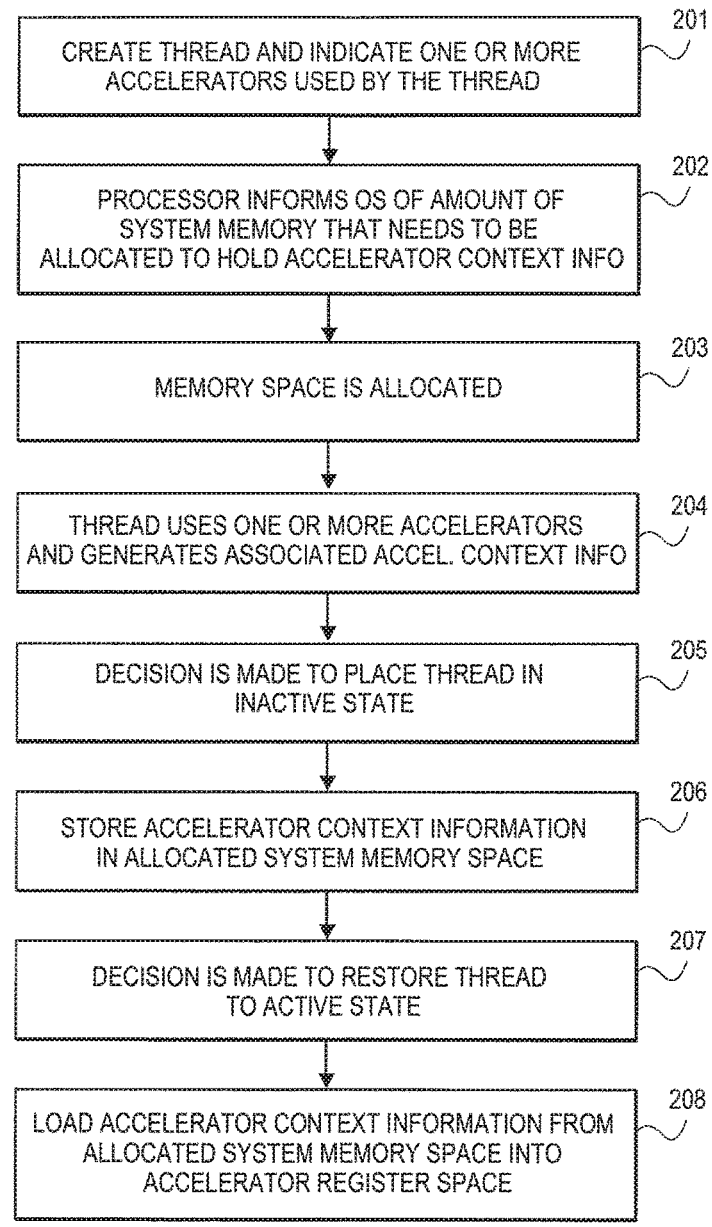
FIG. 2 shows a process for context switching a thread that uses an accelerator that is tightly coupled to a GPP core.

FIG. 2 shows an active/inactive thread switching process that includes the switching between internal registers and system memory of both a standard general purpose CPU core thread context information as well as accelerator related context information.

As observed in the process of FIG. 2, during pre run-time (i.e., before actual execution of a thread's program code by a general purpose CPU core), such as when a programmer is writing code and/or as part of the compilation of a thread's source code into object code, the thread is defined 201. Part of the definition of the thread includes an indication as to whether or not the thread uses any accelerators, and, in a further embodiment, if so, which accelerators are used. Here as observed in the new core 100 approach of FIG. 1, multiple accelerators 101_1 to 101_N "hang off" a general purpose CPU core 102. A thread may use none, some or all such accelerators depending on the purpose/role of the thread.

Here, as a typical case, the thread is defined as part of an application software program that runs "on top of" an operating system (e.g., application 110_1 that runs on top of OS instance 107_1 which runs on top of VMM 109). During runtime, the OS is responsible for assigning the thread to a particular CPU core. As part of the assignment process, in the case where the thread contains program code that uses an accelerator, the OS writes information into the CPU core that indicates the use of one or more accelerators 201.

Subsequently, the processor informs the OS of the amount of space in system memory that needs to be allocated in order to externally save the state information of the one or more accelerators 202. In response the OS proceeds to allocate the memory space 203.

Upon the thread's actual activation and execution on the general purpose CPU core, the one or more accelerators are used by the thread. Actual operation of the one or more accelerators causes state information associated with the one or more accelerators to be generated 204. Upon a subsequent decision being made that the thread should go to an inactive state 205, as part of the active to inactive state change of the thread, the context information of the one or more accelerators is stored 206 in the memory space that was previously allocated in process 203.

Although not depicted in FIG. 2, other state information of the thread (such as state information of the general purpose CPU core registers (e.g., integer registers, floating point registers, vector registers, etc.) may be externally saved into system memory commensurate with the saving of the state information of the accelerators.

Upon a later decision to revive the thread and convert it from an inactive to active state 207, the state information associated with the thread's one or more accelerators that was saved in process 206 is recalled from system memory and loaded into the one or more accelerators' associated register space 208.

Depending on implementation, the state information of specific accelerators can be individually saved/not saved during an active to inactive thread state transition as a function, for example, of whether or not the thread has actually used a specific accelerator. For example, the OS may enable three accelerators for a particular thread, yet, after initial execution of the thread up to its first active to inactive transition, only one of the accelerators has actually been used by the thread. In this case, only the state information of the actually used thread needs to be externally saved to memory.

As such, in an embodiment, the thread keeps track of which accelerators it has actually used and takes steps to only save the state information of the accelerators that have been used when a decision is made to switch the thread from an active to inactive state. According to one approach, the tracking of which accelerators have been used is "cleared" each time the thread enters an active state (e.g., when the thread is first created and each time the thread switches from an inactive to an active state).

In an embodiment, a vector is maintained by the thread having a bit position for each accelerator in the core. When the thread enters an active state all accelerator bits are set to 0 and each time an accelerator is subsequently used for the first time since the entrance of the thread to the active state, the bit position for that accelerator is set to 1. Upon a decision being made to have the thread enter the inactive state, the vector is used to determine which accelerators actually need to have their state saved from internal registers to external system memory.

Figure 3:
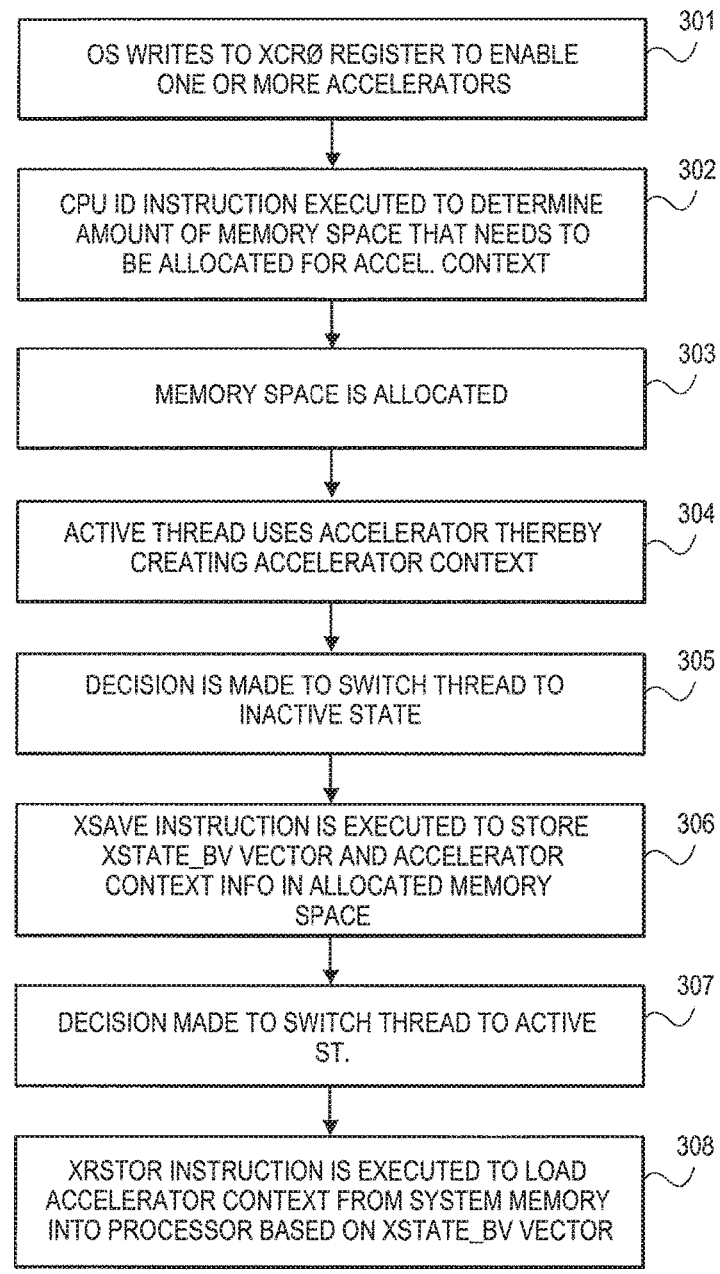
FIG. 3 shows an embodiment of the process of FIG. 2.

The processing described above can (but need not) be performed with Intel ISA instructions. FIG. 3 shows an embodiment of the process of FIG. 2 being performed with Intel based technology, where, currently existing Intel instructions are improved upon to embrace context switching of one or more accelerators. Essentially, each accelerator is viewed as an extension beyond x87, SSE and AVX. As observed in FIG. 3, as part of the assignment of a thread to a core and where the thread includes program code that uses an accelerator, the OS writes information into the XCR0 register of the general purpose CPU that enables one or more accelerators 301. Other extensions may also be enabled by setting their specific bits in the XCR0 register as well (e.g., any/all of the x87, SSE and AVX extensions may be enabled).

The OS then executes a CPUID instruction 302 through the general purpose CPU which has functional unit logic circuitry to execution the instruction. The returned information informs the OS of the amount of space in system memory that needs to be allocated in order to externally save the state information of the one or more enabled accelerators. In response the OS proceeds to allocate the memory space 303.

Upon the thread's actual activation and execution on the general purpose CPU, one or more of the enabled accelerators are used by the thread which causes state information associated with the accelerators to be generated 304. Upon a subsequent decision being made that the thread should go to an inactive state 305, an XSAVE instruction is executed 306 on the general purpose CPU that stores the state information of the accelerators into the memory space that was allocated for the state information. The input operand corresponds to a memory location that the OS effectively identified when it allocated the memory space in process 303.

As part of the XSAVE instruction, an XSTATE_BV vector is stored with the state information to indicate which accelerators have had their state information stored in memory. In an embodiment, the information in the XSTATE_BV is used as a mask in the execution of the XSAVE instruction to indicate which specific accelerators are to have their respective state information externally saved. Moreover, in a further embodiment, the XSTATE_BV vector is externally saved in system memory along with the accelerator state information. The XSTATE_BV vector may also indicate the use of other extensions such as the use of x87, SSE and/or AVX extensions.

Commensurate with the execution of the XSAVE instruction, the state information of other "extensions" used by the thread, such as floating point and/or vector register state (including different sized vector state such as 128 bit vectors (SSE) and 256 bit vectors (AVX)) within the GPP core pipeline may also be externally stored into system memory. In an embodiment, the same XSAVE instruction is used to save all such state information (accelerator, floating point and vector (both sizes)). Moreover, commensurate with the execution of the XSAVE instruction, state information of the thread other than that associated with extensions (e.g., integer register state, GPP core pipeline state, etc.) may also be externally stored into system memory.

Upon a later decision to revive the thread from an inactive to active state 307, an XRSTOR instruction is executed 308 to recall the accelerator state from system memory and load it back into its associated one or more accelerators. Here, the XSTATE_BV vector is first read from system memory 309 and examined to understand which extensions had their state written to memory by way of the preceding XSAVE instruction. Upon examination of the XSTATE_BV vector, the processor understands and calls into itself from system memory the state of those extensions who had their state externally stored. The extensions may include one or more accelerators. Thus, the state information of one or more accelerators may be called into the processor (e.g., along with other extensions such as x87, SSE and AVX).

Again, other state information of the thread may also be called into the general purpose CPU core to fully restore the thread.

Exemplary Computer Architectures

FIGS. 4-7 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 4:
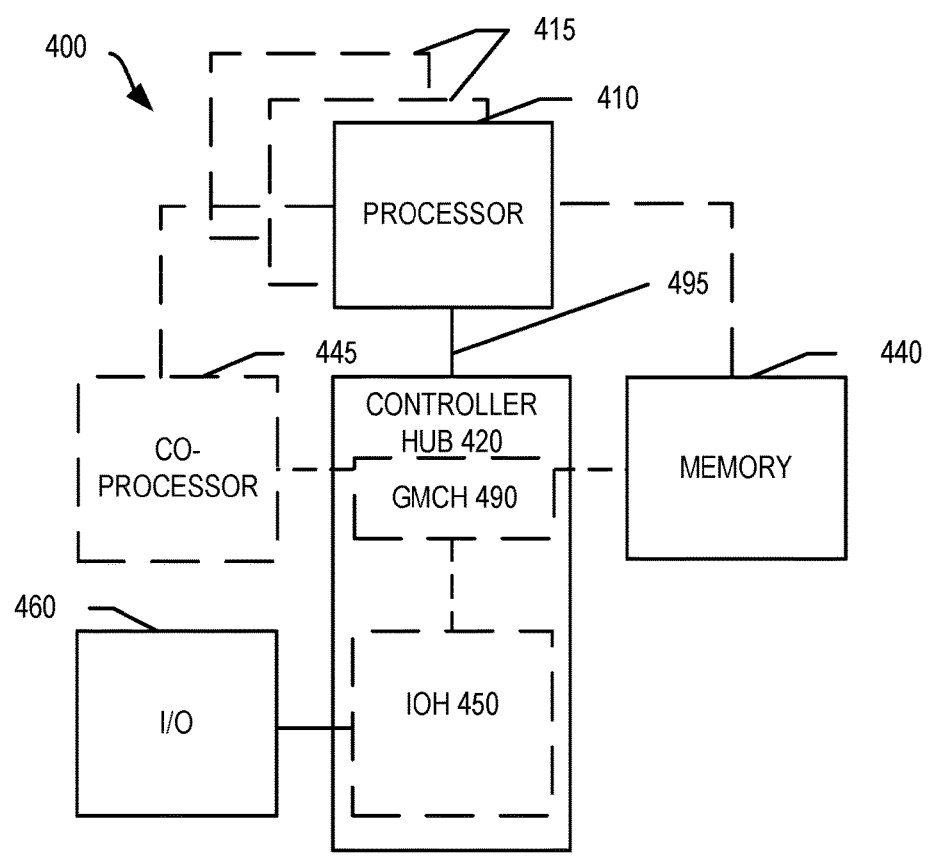
FIG. 4 shows a first computing system embodiment.

Referring now to FIG. 4, shown is a block diagram of a system 400 in accordance with one embodiment of the present invention. The system 400 may include one or more processors 410, 415, which are coupled to a controller hub 420. In one embodiment the controller hub 420 includes a graphics memory controller hub (GMCH) 490 and an Input/Output Hub (IOH) 450 (which may be on separate chips); the GMCH 490 includes memory and graphics controllers to which are coupled memory 440 and a coprocessor 445; the IOH 450 is couples input/output (I/O) devices 460 to the GMCH 490. Alternatively, one or both of the memory and graphics controllers are integrated within the processor (as described herein), the memory 440 and the coprocessor 445 are coupled directly to the processor 410, and the controller hub 420 in a single chip with the IOH 450.

The optional nature of additional processors 415 is denoted in FIG. 4 with broken lines. Each processor 410, 415 may include one or more of the processing cores described herein and may be some version of the processor 1100.

The memory 440 may be, for example, dynamic random access memory (DRAM), phase change memory (PCM), or a combination of the two. For at least one embodiment, the controller hub 420 communicates with the processor(s) 410, 415 via a multi-drop bus, such as a frontside bus (FSB), point-to-point interface such as QuickPath Interconnect (QPI), or similar connection 495.

In one embodiment, the coprocessor 445 is a special-purpose processor, such as, for example, a high-throughput MIC processor, a network or communication processor, compression engine, graphics processor, GPGPU, embedded processor, or the like. In one embodiment, controller hub 420 may include an integrated graphics accelerator.

There can be a variety of differences between the physical resources 410, 415 in terms of a spectrum of metrics of merit including architectural, microarchitectural, thermal, power consumption characteristics, and the like.

In one embodiment, the processor 410 executes instructions that control data processing operations of a general type. Embedded within the instructions may be coprocessor instructions. The processor 410 recognizes these coprocessor instructions as being of a type that should be executed by the attached coprocessor 445. Accordingly, the processor 410 issues these coprocessor instructions (or control signals representing coprocessor instructions) on a coprocessor bus or other interconnect, to coprocessor 445. Coprocessor(s) 445 accept and execute the received coprocessor instructions.

Figure 5:
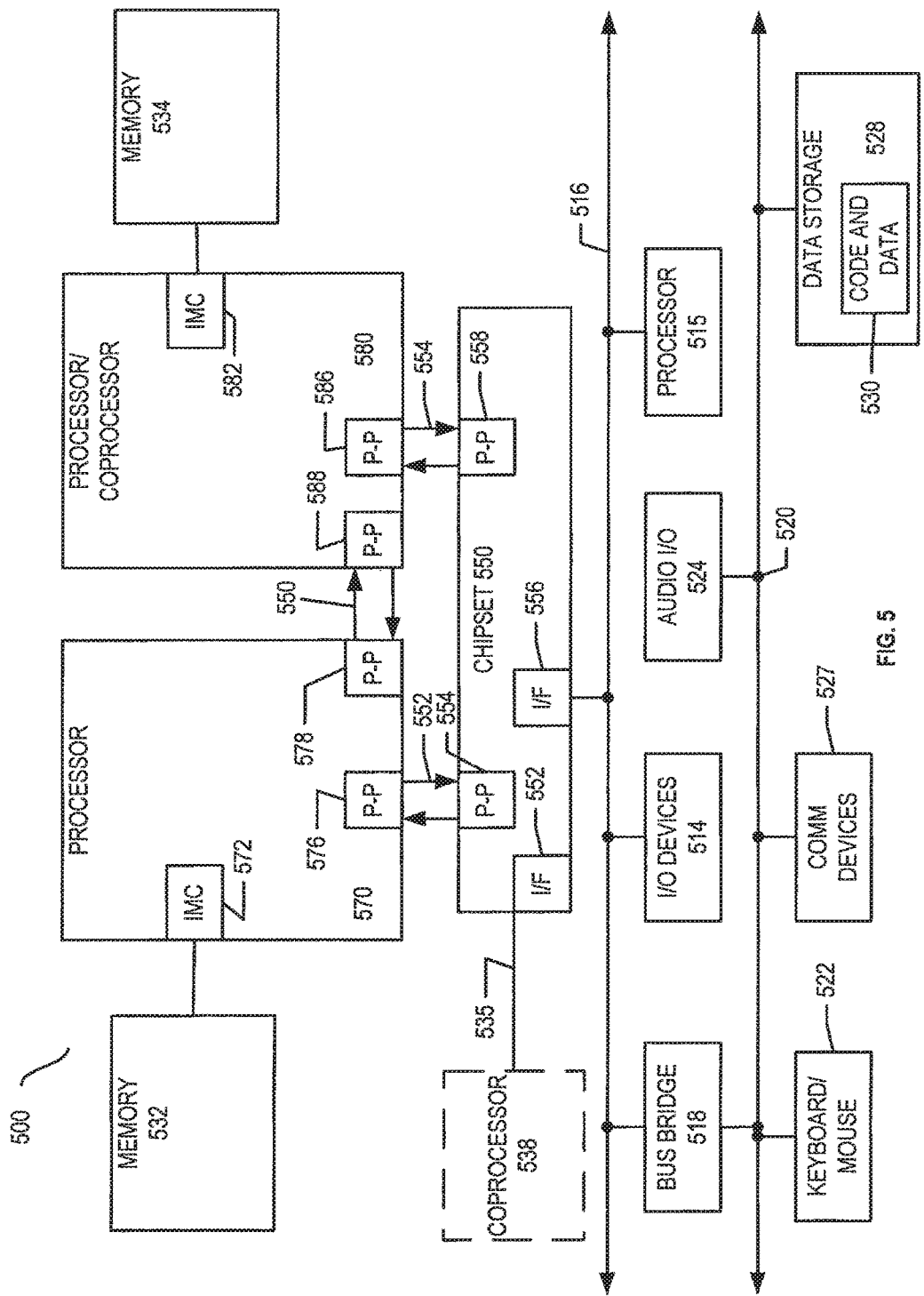
FIG. 5 shows a second computing system embodiment.

Referring now to FIG. 5, shown is a block diagram of a first more specific exemplary system 500 in accordance with an embodiment of the present invention. As shown in FIG. 5, multiprocessor system 500 is a point-to-point interconnect system, and includes a first processor 570 and a second processor 580 coupled via a point-to-point interconnect 550. Each of processors 570 and 580 may be some version of the processor 1100. In one embodiment of the invention, processors 570 and 580 are respectively processors 410 and 415, while coprocessor 538 is coprocessor 445. In another embodiment, processors 570 and 580 are respectively processor 410 coprocessor 445.

Processors 570 and 580 are shown including integrated memory controller (IMC) units 572 and 582, respectively. Processor 570 also includes as part of its bus controller units point-to-point (P-P) interfaces 576 and 578; similarly, second processor 580 includes P-P interfaces 586 and 588. Processors 570, 580 may exchange information via a point-to-point (P-P) interface 550 using P-P interface circuits 578, 588. As shown in FIG. 5, IMCs 572 and 582 couple the processors to respective memories, namely a memory 532 and a memory 534, which may be portions of main memory locally attached to the respective processors.

Processors 570, 580 may each exchange information with a chipset 590 via individual P-P interfaces 552, 554 using point to point interface circuits 576, 594, 586, 598. Chipset 590 may optionally exchange information with the coprocessor 538 via a high-performance interface 539. In one embodiment, the coprocessor 538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another third generation I/O interconnect bus, although the scope of the present invention is not so limited.

As shown in FIG. 5, various I/O devices 514 may be coupled to first bus 516, along with a bus bridge 518 which couples first bus 516 to a second bus 520. In one embodiment, one or more additional processor(s) 515, such as coprocessors, high-throughput MIC processors, GPGPU's, accelerators (such as, e.g., graphics accelerators or digital signal processing (DSP) units), field programmable gate arrays, or any other processor, are coupled to first bus 516. In one embodiment, second bus 520 may be a low pin count (LPC) bus. Various devices may be coupled to a second bus 520 including, for example, a keyboard and/or mouse 522, communication devices 527 and a storage unit 528 such as a disk drive or other mass storage device which may include instructions/code and data 530, in one embodiment. Further, an audio I/O 524 may be coupled to the second bus 520. Note that other architectures are possible. For example, instead of the point-to-point architecture of FIG. 5, a system may implement a multi-drop bus or other such architecture.

Figure 6:
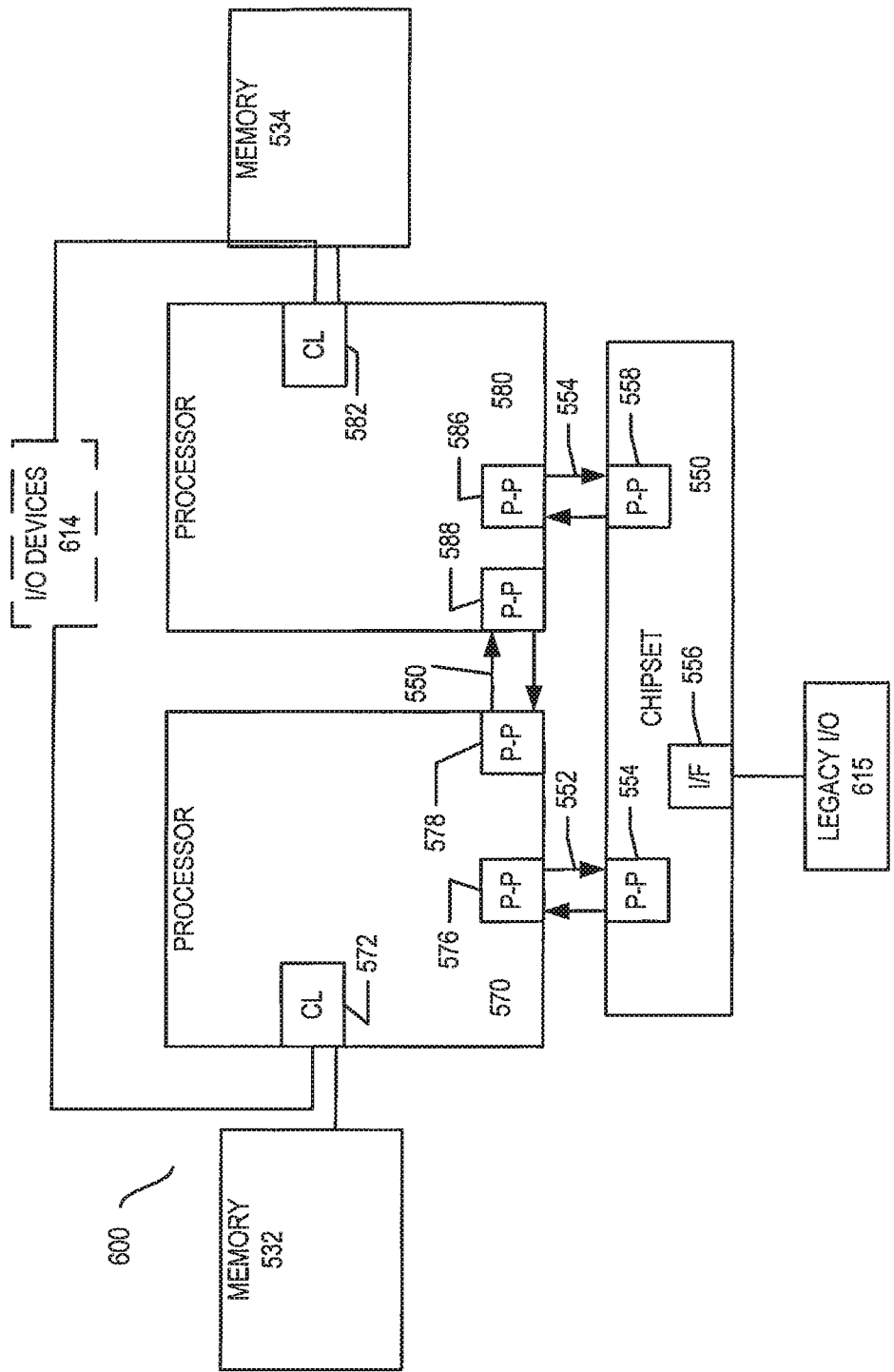
FIG. 6 shows a third computing system embodiment.

Referring now to FIG. 6, shown is a block diagram of a second more specific exemplary system 600 in accordance with an embodiment of the present invention Like elements in FIGS. 5 and 6 bear like reference numerals, and certain aspects of FIG. 5 have been omitted from FIG. 6 in order to avoid obscuring other aspects of FIG. 6.

FIG. 6 illustrates that the processors 570, 580 may include integrated memory and I/O control logic ("CL") 572 and 582, respectively. Thus, the CL 572, 582 include integrated memory controller units and include I/O control logic. FIG. 6 illustrates that not only are the memories 532, 534 coupled to the CL 572, 582, but also that I/O devices 614 are also coupled to the control logic 572, 582. Legacy I/O devices 615 are coupled to the chipset 590.

Figure 7:
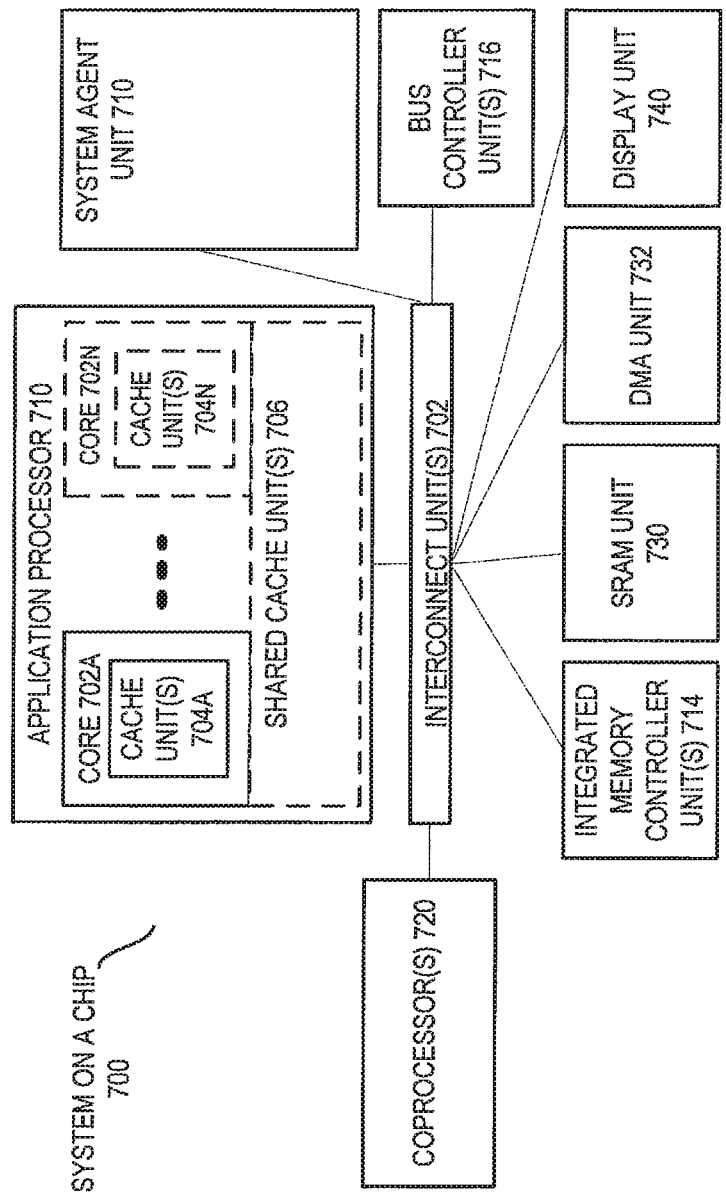
FIG. 7 shows a fourth computing system embodiment.

Referring now to FIG. 7, shown is a block diagram of a SoC 700 in accordance with an embodiment of the present invention. Dashed lined boxes are optional features on more advanced SoCs. In FIG. 7, an interconnect unit(s) 702 is coupled to: an application processor 710 which includes a set of one or more cores 702A-N and shared cache unit(s) 706; a system agent unit 710; a bus controller unit(s) 716; an integrated memory controller unit(s) 714; a set or one or more coprocessors 720 which may include integrated graphics logic, an image processor, an audio processor, and a video processor; an static random access memory (SRAM) unit 730; a direct memory access (DMA) unit 732; and a display unit 740 for coupling to one or more external displays. In one embodiment, the coprocessor(s) 720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 530 illustrated in FIG. 5, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 8 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 8 shows a program in a high level language 802 may be compiled using an x86 compiler 804 to generate x86 binary code 806 that may be natively executed by a processor with at least one x86 instruction set core 816. The processor with at least one x86 instruction set core 816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 804 represents a compiler that is operable to generate x86 binary code 806 (e.g., object code) that can, with or without additional linkage processing, be executed on the processor with at least one x86 instruction set core 816. Similarly, FIG. 8 shows the program in the high level language 802 may be compiled using an alternative instruction set compiler 808 to generate alternative instruction set binary code 810 that may be natively executed by a processor without at least one x86 instruction set core 814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 812 is used to convert the x86 binary code 806 into code that may be natively executed by the processor without an x86 instruction set core 814. This converted code is not likely to be the same as the alternative instruction set binary code 810 because an instruction converter capable of this is difficult to make; however, the converted code will accomplish the general operation and be made up of instructions from the alternative instruction set. Thus, the instruction converter 812 represents software, firmware, hardware, or a combination thereof that, through emulation, simulation or any other process, allows a processor or other electronic device that does not have an x86 instruction set processor or core to execute the x86 binary code 806.

What is claimed is:

1. A processor comprising:
  a plurality of accelerators;
  a decoder to decode a first instruction into a decoded first instruction, and a second instruction into a decoded second instruction; and
  an execution unit to:
    execute the first decoded instruction to, for a thread executing on at least one accelerator of the plurality of accelerators that is to be placed in an inactive state, cause a save of context information for each of the at least one accelerator of the plurality of accelerators for the thread, and a save of a vector identifying the at least one accelerator corresponding to the context information, and
    execute the second decoded instruction to read the vector to determine which of the plurality of accelerators have saved context information for the thread, read the saved context information, and restore the saved context information into the at least one accelerator.

2. The processor of claim 1, wherein the at least one accelerator is multiple accelerators and less than all of the plurality of accelerators.

3. The processor of claim 1, further comprising a register having fields to individually enable certain ones of the plurality of accelerators.

4. The processor of claim 1, wherein the at least one accelerator operates out of a same memory space as the execution unit.

5. The processor of claim 1, wherein the vector comprises a field to indicate an instruction set extension that is enabled for the thread.

6. A method comprising:
  decoding a first instruction into a decoded first instruction, and a second instruction into a decoded second instruction with a decoder of a processor;
  executing the first decoded instruction with an execution unit of the processor to, for a thread executing on at least one accelerator of a plurality of accelerators of the processor that is to be placed in an inactive state, cause a save of context information for each of the at least one accelerator of the plurality of accelerators for the thread, and a save of a vector identifying the at least one accelerator corresponding to the context information; and executing the second decoded instruction with the execution unit of the processor to read the vector to determine which of the plurality of accelerators have saved context information for the thread, read the saved context information, and restore the saved context information into the at least one accelerator.

7. The method of claim 6, wherein the at least one accelerator is multiple accelerators and less than all of the plurality of accelerators.

8. The method of claim 6, further comprising providing a register having fields to individually enable certain ones of the plurality of accelerators.

9. The method of claim 6, further comprising operating the at least one accelerator out of a same memory space as the execution unit.

10. The method of claim 6, wherein the vector comprises a field to indicate an instruction set extension that is enabled for the thread.

11. A non-transitory machine readable medium containing program instructions that when processed by a processor cause a method to be performed, the method comprising:

decoding a first instruction into a decoded first instruction, and a second instruction into a decoded second instruction with a decoder of the processor;

executing the first decoded instruction with an execution unit of the processor to, for a thread executing on at least one accelerator of a plurality of accelerators of the processor that is to be placed in an inactive state, cause a save of context information for each of the at least one accelerator of the plurality of accelerators for the thread, and a save of a vector identifying the at least one accelerator corresponding to the context information; and executing the second decoded instruction with the execution unit of the processor to read the vector to determine which of the plurality of accelerators have saved context information for the thread, read the saved context information, and restore the saved context information into the at least one accelerator.

12. The non-transitory machine readable medium of claim 11, wherein the at least one accelerator is multiple accelerators and less than all of the plurality of accelerators.

13. The non-transitory machine readable medium of claim 11, wherein the method further comprises providing a register having fields to individually enable certain ones of the plurality of accelerators.

14. The non-transitory machine readable medium of claim 11, wherein the method further comprises operating the at least one accelerator out of a same memory space as the execution unit.

15. The non-transitory machine readable medium of claim 11, wherein the vector comprises a field to indicate an instruction set extension that is enabled for the thread.

16. A processor comprising:

an accelerator;

a decoder to decode a first instruction into a decoded first instruction, and a second instruction into a decoded second instruction; and an execution unit to:

execute the first decoded instruction to, for a thread executing on the accelerator that is to be placed in an inactive state, cause a save of context information for the thread, and a save of a vector identifying the accelerator corresponding to the context information, and execute the second decoded instruction to read the vector to determine the accelerator to restore saved context information into for the thread, read the saved context information, and restore the saved context information into the accelerator.

17. The processor of claim 16, wherein the accelerator is multiple accelerators and less than all of a plurality of accelerators of the processor.

18. The processor of claim 16, further comprising a register having fields to individually enable certain ones of a plurality of accelerators of the processor that includes the accelerator.

19. The processor of claim 16, wherein the accelerator operates out of a same memory space as the execution unit.

20. The processor of claim 16, wherein the vector comprises a field to indicate an instruction set extension that is enabled for the thread.

* * * * *